(12) United States Patent
Jenko (10) Patent No.: US 6,555,044 B2
(45) Date of Patent: Apr. 29, 2003

(54) HOT RUNNER VALVE GATE PISTON ASSEMBLY

(75) Inventor: Edward J. Jenko, Essex Junction, VT (US)

(73) Assignee: Husky Injection Molding Systems LTD, Bolton (CA)

( * ) Notice: Subject to any disclaimer, the term of this patent is extended or adjusted under 35 U.S.C. 154(b) by 0 days.

(21) Appl. No.: 09/991,782

(22) Filed: Nov. 26, 2001

(65) Prior Publication Data

US 2002/0037339 A1 Mar. 28, 2002

Related U.S. Application Data

(62) Division of application No. 09/550,286, filed on Apr. 14, 2000, now Pat. No. 6,343,925.

(51) Int. Cl.[7] ............................................. B29C 45/20
(52) U.S. Cl. ................................. 264/328.1; 264/219
(58) Field of Search ............................ 264/328.1, 219; 425/549

(56) References Cited

U.S. PATENT DOCUMENTS

| | | | |
|---|---|---|---|
| 3,037,245 A | 6/1962 | Darnell | |
| 4,173,448 A | 11/1979 | Rees et al. | 425/549 |
| 4,213,751 A | 7/1980 | Fernandez | 425/566 |
| 5,022,846 A | 6/1991 | Schmidt | 425/564 |
| 5,071,340 A | 12/1991 | LaBianca | 264/328.15 |
| 5,374,182 A | 12/1994 | Gessner | 425/562 |
| 5,478,230 A | 12/1995 | McGrevy | 425/566 |
| 6,164,954 A | 12/2000 | Mortazavi et al. | 425/549 |

*Primary Examiner*—Jan H. Silbaugh
*Assistant Examiner*—Monica A Fontaine
(74) *Attorney, Agent, or Firm*—Katten Muchin Zavis Rosenman (57) ABSTRACT

Improved hot runner valve gate piston apparatus and method includes structure and steps whereby the air piston cylinder wall transmits less than all of the compressive force between the backplate and the manifold. Preferably, a backup pad is disposed in contact with the manifold and the backplate, for transmitting some of these compressive forces. Preferably, the backup pad also transmits heat from the backplate to the manifold, reducing the temperature of the cylinder wall. A flex member is preferably provided adjacent to or integral with the cylinder for absorbing some of the compressive forces between the backplate and the manifold, and in order to maintain the air seal between the piston cylinder in the air channel in the hot runner backplate.

5 Claims, 8 Drawing Sheets

HOT RUNNER VALVE GATE PISTON ASSEMBLY

This is a divisional application of application Ser. No. 09/550,286, filed Apr. 14, 2000, now U.S. Pat. No. 6,343,925.

BACKGROUND OF THE INVENTION

1. Field of the Invention

The present invention relates to improvements in valve gate piston assemblies typically used in hot runner plastic injection molds. In particular, the present invention relates to improved air piston cylinder apparatus and method that provide improved sealing, improved heat-management properties, less expensive parts, and longer seal life.

2. Related Art

Hot runner valve gate assemblies are well known in the art of injection molding. U.S. Pat. No. 4,173,448 to Rees shows a typical arrangement in which the valve stem is moved up and down by an air piston housed in a cylinder. A valve bushing is mounted in the hot runner manifold and is designed to seal the plastic within the melt channel. However, one drawback of this design is that the cylinder walls are required to transmit all the considerable compressive forces passing from the manifold to the mold backing plate. At the same time, the cylinder walls must effect a proper air seal between the air supply channels in the backing plate and the cylinder contained in the bushing, for pneumatic operation of the double-acting piston. Moreover, the backing plate bore depth must be manufactured to a very tight tolerance in order to achieve the fine balance of sufficient compression to prevent air or resin leakage while not overstressing the components of the assembly. The various components of the valve gate assembly are likewise tightly toleranced, all of which add greatly to cost.

In addition, current cylinder walls must be strong enough to resist the side forces acting on them as the manifold thermally expands laterally thereby causing the bushing assembly to slide across the face of the mold backing plate. In the '448 Patent design, the cylinder walls also contain conduits for the air to be carried from the backing plate to the cylinder space underneath the piston so that a double acting motion of the air piston can be effected. For this latter reason the cylinder walls are thickened locally. This presents another problem with current cylinder design in that heat from the manifold conducted along the cylinder walls causes the interior surface of the cylinder to be at an elevated temperature thereby drastically shortening the life of the piston seal that must slide along the surface of that wall. Furthermore, heat conducted to the piston via the valve stem (which is directly surrounded by the hot plastic melt stream) also causes the piston to be at an elevated temperature, further contributing to the deterioration of the piston seal. Also, to change the seals, the backing plate must be removed so that the piston can be extracted from the back of the cylinder. Another valve gate piston assembly is shown in U.S. Pat. No. 3,037,245 to Darnell, which shows the air piston housed in a cylinder mounted entirely in the backing plate. The valve bushing 28 is a separate piece mounted in the manifold in FIG. 1, or as an attachment to the cylinder, as shown in FIG. 2. These components are very expensive due to the tight tolerances required for structural integrity and adequate sealing forces. In addition, the thick walls of the cylinder and the piston itself again cause premature deterioration of the piston seal by overheating. The compressive sealing force is transmitted from the manifold solely via the bushing walls to the back plate.

U.S. Pat. No. 4,213,751 to Fernandez, relies on the nozzle housing to seal the plastic at 44 with the valve stem. The air piston assembly is located entirely in the backing plate so that a low temperature environment is available for good seal life. All the compressive forces are transmitted via a separate bushing 70 directly from the manifold to the backplate, none of the force is transmitted through the cylinder wall. However, because the air piston assembly is fixed in the backplate, unable to slide laterally with the manifold as it thermally expands, the valve stem 42 must bend to accommodate this relative movement between the two. Consequently, the stem tends to wear the sealing diameter inside the nozzle housing at 46, eventually causing plastic to leak at that point Furthermore the bending of the stem will cause the piston bushing 68 to wear allowing air from the cylinder to leak. Similarly, U.S. Pat. No. 4,469,191 to Gellert exhibits the same characteristics of a bending valve stem. The '191 Patent provides no teaching regarding how the compressive forces from the manifold are transmitted to the backplate.

U.S. Pat. No. 5,022,846 to Schmidt shows another bending stem configuration. However, in the '846 Patent, the valve bushing sealing the plastic is mounted in the manifold and acts as the bottom seal for the air in the piston assembly. A graphite piston seal is used instead of the less costly, but more temperature sensitive, polymer seals. The '846 Patent seal runs directly inside a through-hole bore within the backing plate, which does not require tight bore depth tolerances but which may require expensive surface finishing of the bore. Also, the bending action of the stem causes wearing of the bushing in the manifold. The compressive forces are transmitted entirely through the bushing 56 from the manifold to the backplate.

U.S. Pat. No. 5,071,340 to LaBianca shows a conventional valve bushing arrangement with a sliding seal in the plate. However, the air supply to the piston is routed through the valve stem to provide cooling thereof. There is no reduction in the temperature of the surfaces on which the air piston seals operated, and all the compressive forces from the manifold are transmitted via the cylinder wall to the backplate.

U.S. Pat. No. 5,374,182 to Gessner shows another embodiment of a conventional valve bushing with sliding seal. In the '340 Patent, the bushing 130 and cylinder body 136 are two pieces fastened together with a nut 158. Tight tolerances are still required for the cylinder and the plate bore depth. Additionally, the cylinder walls and piston, design do nothing to lower the surface temperature where the piston seals operate. All the compressive forces from the manifold are transmitted via the cylinder wall to the backplate. The '340 Patent, like all the other configurations in which the thermal compression forces are used to maintain the air seal between the cylinder and the backplate, requires that the manufacturing tolerances of the components making up the stack be very closely controlled, typically ±0.0005". Obviously, this makes manufacturing very costly. For example, the bore depth in the backplate typically has a tolerance of +0.0002". Furthermore, the compression forces transmitted through the cylinder walls are on the order of 10,000–20,000 lbs, which requires the components transmitting these forces to be made of steel or equivalent high strength materials that even in comparatively thin sections are still good conductors of heat.

U.S. Pat. No. 5,478,230 to McGrevy discloses a valve gate assembly mounted in a back-to-back configuration suitable for use in a stack mold. In this arrangement, the valve piston assemblies are mounted in a common cylinder housing inside the manifold. Air supply to both sides of the piston is routed along the outside of the cylinder walls. However, there is no disclosure of using the air to cool the surface along which the piston seals operate. Indeed '230 Patent discloses that the seals are made from expensive "reinforced high temperature plastic"(col. 5 ln 12). To change the seals, the support plates and manifold assembly must be dismantled—a time consuming and costly operation.

There is, therefore, a need for a valve gate air piston assembly in which manufacturing tolerances can be increased, low cost piston seals can be used, effective operation over a long service life can be achieved, and convenient access to the seals can be provided for easy serviceability.

SUMMARY OF THE INVENTION

The present invention provides an improved valve gate piston assembly for use in hot runner molds in which only part of the compressive forces between the manifold and the backplate are transmitted through the piston cylinder, to maintain the air seal against the mold plate. Preferably, the piston cylinder uses an integral spring or resilient means to provide sufficient air sealing forces, thus allowing the constituent components of the assembly to be made with less precision and less cost. Preferably, a backup pad is used as a second path to transmit the compressive forces between the manifold and the backplate. This second path also transfers a good amount of heat from the manifold to the backplate, thus lowering the temperature of the piston cylinder, leading to a longer piston seal life.

According to a first aspect of the present invention, air cylinder apparatus for a hot runner nozzle assembly includes an air piston cylinder dimensioned to form an air seal with an air piston, and disposed to transmit less than all of the compressive force between the hot runner manifold and the backplate. A spring is disposed to flex when the compressive force is applied between the hot runner manifold and the backplate.

According to another aspect of the present invention, apparatus for an air piston of a hot runner nozzle assembly includes an air piston cylinder for engaging the air piston The air piston cylinder provides a first path for transmitting the compressive force between the hot runner manifold and the backplate. A backup pad is disposed to provide a second path to transmit the compressive force between the hot runner manifold and the backplate.

According to a further aspect of the present invention, an air cylinder for a hot runner nozzle includes a piston cylinder in air communication with an air channel in the backplate. The piston cylinder is disposed to transmit less than all of the compressive force between the manifold and the backplate to cause an air seal to be maintained between the piston cylinder and the air channel.

According to yet another aspect of the present invention, apparatus for an air piston in a hot runner assembly includes a piston cylinder forming an air seal with the air piston, and in air communication with an air channel in the hot runner backplate. The piston cylinder transmits less than all of the compressive force and less than all of the heat transfer between the backplate and a manifold. A backup pad is disposed in contact with the manifold and the backplate, for transmitting both the compressive force and the heat transfer between the backplate and the manifold. A flex member is provided for absorbing compressive force between the backplate and the manifold to maintain the air seal between the piston cylinder and the air channel.

According to still another aspect of the present invention, a method of sealing an air piston in a hot runner nozzle assembly, includes the steps of: (i) sealing the air piston with a piston cylinder disposed between the hot runner manifold and the backplate; and (ii) causing compressive forces to be transmitted between the hot runner manifold and the backplate via the piston cylinder and the via a backup pad.

DETAILED DESCRIPTION OF THE PREFERRED EMBODIMENTS

The present invention achieves improved sealing, longer part life, and reduced manufacturing costs by ensuring that less than all of the compressive forces between the manifold and the backplate are transmitted through the piston cylinder. Preferably, a backup pad is used as a second path to transmit these compressive forces. The backup pad also provides a second path for transferring heat from the manifold to the backplate, thus reducing the heat transferred through the piston cylinder. In a preferred form, the piston cylinder has an integral spring (bevel or flange) at one end thereof to provide sufficient sealing forces between the piston cylinder and the air channels in the backplate.

In the present invention, the overall nozzle housing assembly and spring pack for maintaining the sealing pressure of the stack against the manifold is similar to that described in U.S. Pat. No. 5,374,182 to Gessner (incorporated herein by reference). However, the multiple spring stack of Gessner has been replaced with a single spring washer and insulator (to be described below), but their function is the same—to maintain a compressive sealing force between the nozzle housing and the manifold regardless of temperature of the components.

Figure 1:
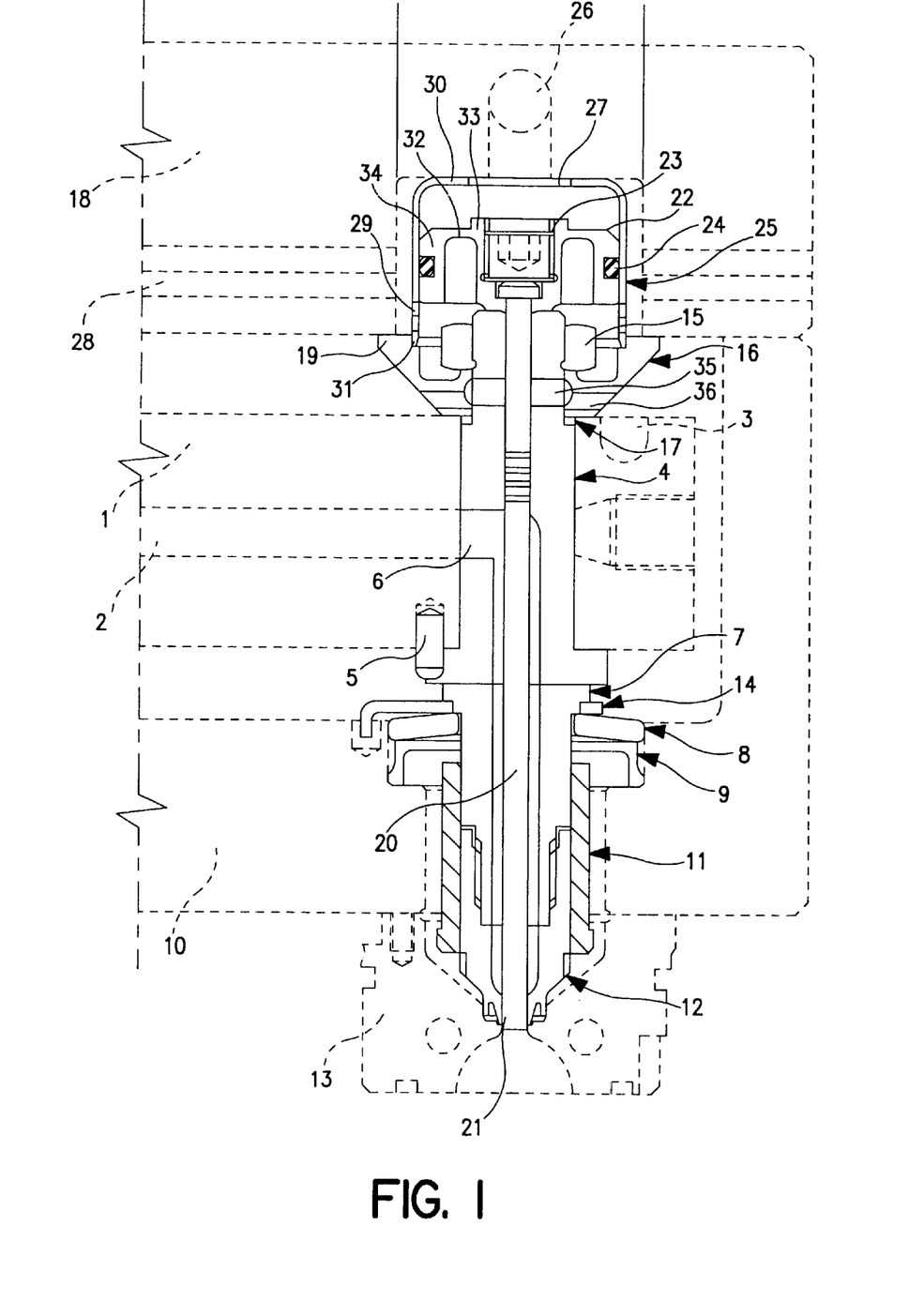
FIG. 1. A section view through the valve gate nozzle assembly of the invention.

With reference to FIG. 1, hot runner manifold 1 contains plastic melt channel 2 and heater 3. Bushing 4 is assembled through a bore in the manifold such that dowel 5 aligns the melt channel 6 in the bushing with melt channel 2 in the manifold. Nozzle housing 7 is urged against the head of the bushing by spring washer 8 that rests on titanium insulator 9 located in a bore in manifold plate 10. The nozzle housing is heated by heater 11 and carries a tip 12 that locates the housing in the mold cavity insert 13. Anti rotation clip 14 is used to prevent housing 7 from rotation when tip 12 is threaded or unthreaded from the housing.

Bushing 4 is held in the manifold by nut 15 that traps backup pad 16 and, when tightened, causes metal "O" ring 17 to seal tightly, thereby preventing any plastic leakage along the bore of the bushing 4. Backup pad 16 resists most of the compressive force applied by spring washer 8 to the manifold. The backup washer transmits this partial force directly to the backplate 18 via annular shoulder 19. As the manifold is heated by heater 3, and indirectly by the nozzle heater 11, it expands laterally causing the bushing 4 to slide over the mating surface of the nozzle housing 7, and causing the shoulder 19 of the backup pad 16 to slide over the surface of backplate 18. Valve stem 20, guided through bushing 4 and used for closing gate 21 at the end of the nozzle tip 12, also moves laterally with the manifold as it expands. No bending of the stem occurs.

Figure 4:
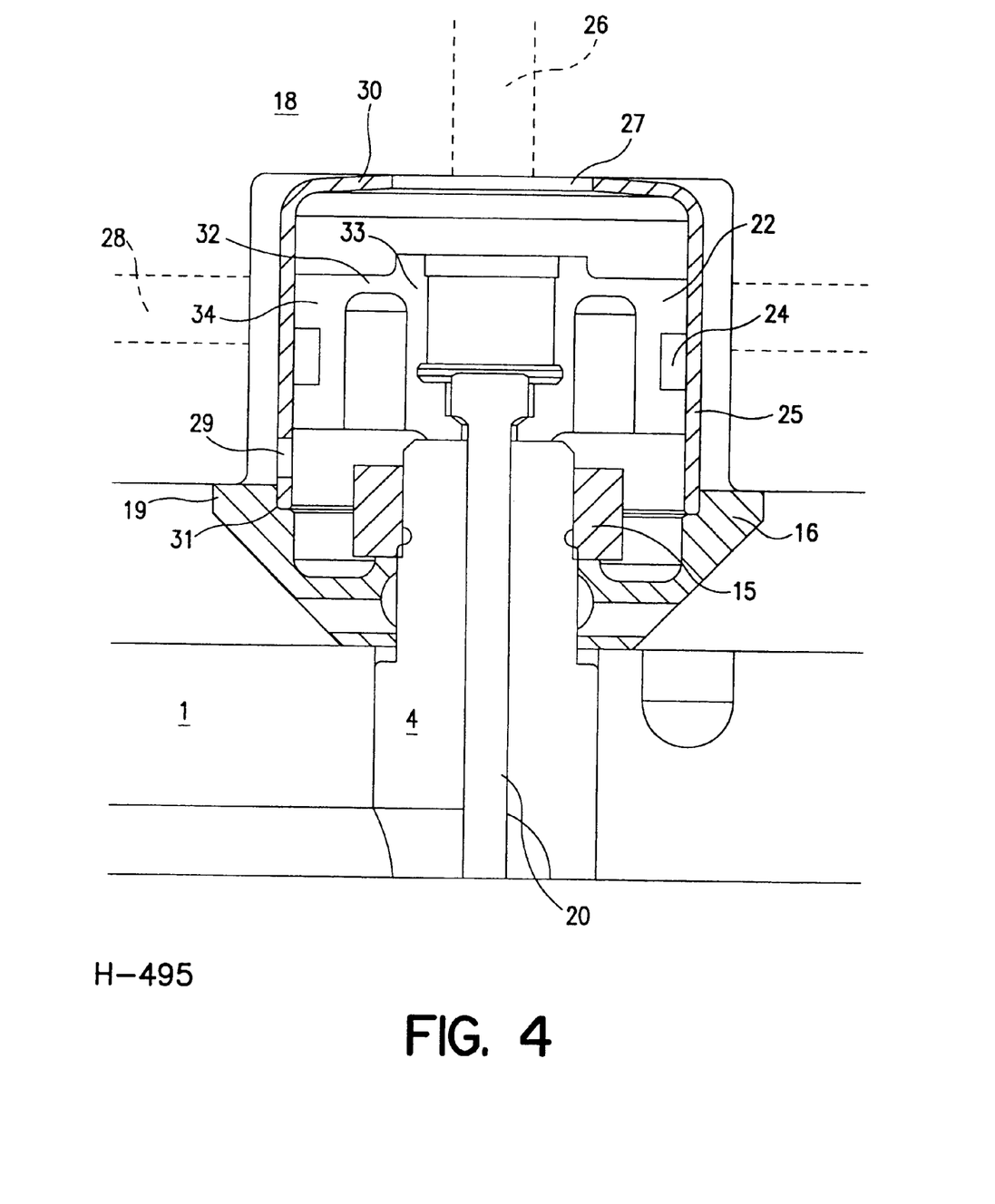
FIG. 4. A section view through the piston/cylinder assembly of the preferred embodiment of the invention.

An enlarged section view of the preferred embodiment of the piston/cylinder configuration is shown in FIG. 4. Air piston 22 holds the head of the valve stem 20 via set screw 23 such that when the piston 22 is moved the stem moves. Piston 22 has a seal 24 which slides on the inner surface of cylinder 25 maintaining an air seal between the opposed faces of the piston such that when compressed air is admitted via channel 26 via hole 27 in the top of cylinder 25, it causes the piston to move downward, thereby closing the gate 21 with stem 20. When compressed air is admitted via channel 28 via hole 29 in the side wall of cylinder 25, it causes the piston to move upward thereby opening the gate 21 by retracting stem 20.

Cylinder 25 is a thinwalled metal part and has its upper end formed in a slightly raised, annular bevel 30 such that this end wall acts like a spring, constantly urging the cylinder toward the manifold 1. The cylinder's lower edge 31 fits snugly in a recessed annular step in backup pad 16. Sufficient of the compressive sealing force from spring washer 8 is directed through the walls of cylinder 25 such that an air seal is maintained at the lower edge 31 and at the bevel 30 at all operating temperatures of the assembly. This ensures there is no leakage of air from the channels 26 and 28 respectively during operation. Forces required to seal the cylinder are in the order of 1,000–2,000 lbs, a tenth of the prior art designs. The tolerances required for manufacturing the stack items are in the order of ±0.005", up to ten times greater than the prior art designs. As one example, the cylinder 25 may comprise a metal cylinder, through which compressive forces are transmitted. The bevel may have an opening at the top.

Prior art configurations that transmit all the compressive sealing force of the stack to the backplate via the air cylinder walls, required the cylinder wall to be strong enough to transmit this force. This has been achieved in the past by using steel, typically H-13 or the like and a wall thickness sufficient to bear the load. This has caused the wall to also act as reasonably efficient thermal conductor in transmitting heat from the manifold via the cylinder wall to the cooled backplate, thereby causing the running surface for the air piston seal to be hotter than desirable. In contrast, according to the instant invention, a thinner, more heat-resistive material may be used in the construction of the cylinder 25, thus leading to a lower temperature where the piston seal contacts the cylinder wall. In more detail, in the present invention, the cylinder wall needs only to be strong enough to maintain an air seal at its interface with the backplate 18. By incorporating a spring means associated with the cylinder or a more resilient cylinder construction, the backplate bore depth tolerances and the cylinder height tolerance can be increased, for less costly manufacturing. Most of the compressive force from spring washer 8 is directed via backup pad 16 to the backplate 18 at shoulder 19. Consequently, the cylinder wall can be made of thinner, weaker material than conventionally used and therefore can have greater thermal resistance thereby ensuring the temperature of the running surface for air piston seal 24 is low enough to allow a lower cost seal to be used while maintaining a long service life. Drainage passages 35 and 36 in the bushing 4 and backup pad 16 allow any leakage of plastic along the valve stem to escape.

A second feature designed to minimize the temperature of the environment of the seal is the shape of the piston 22 itself. Unlike prior art pistons the instant invention teaches providing a thin cross section 32 radially connecting the hub 33 to the peripheral flange 34 where the seal is located. By locally reducing the cross section of the piston material available for conducting heat from the hot valve stem head the temperature of the piston seal area is substantially reduced. Alternatively, the piston can be made of a material having a high resistance to thermal conductivity such as an engineering polymer.

Figure 2:
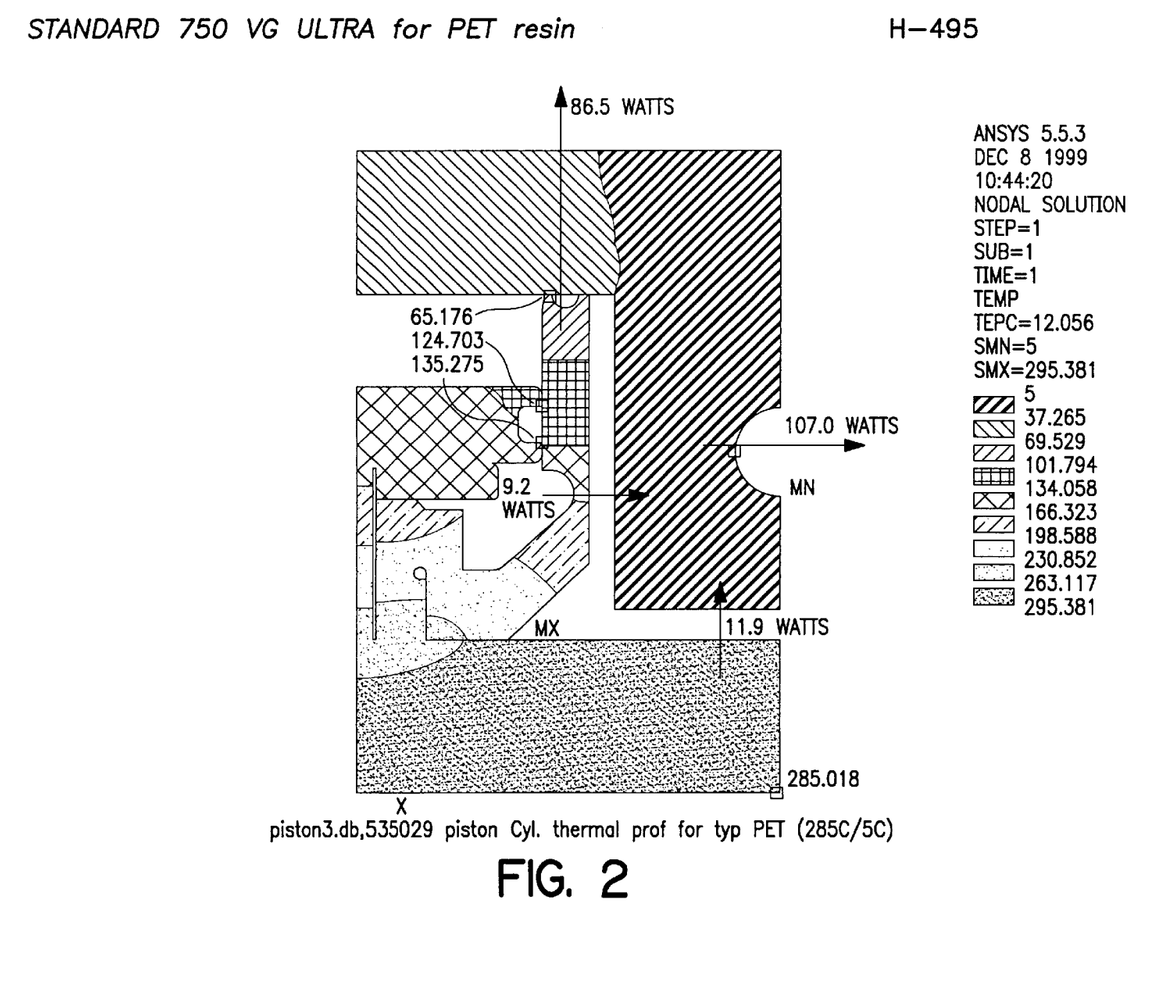
FIG. 2. A thermal image section view of the air piston cylinder installation for a standard valve gate design.
Figure 3:
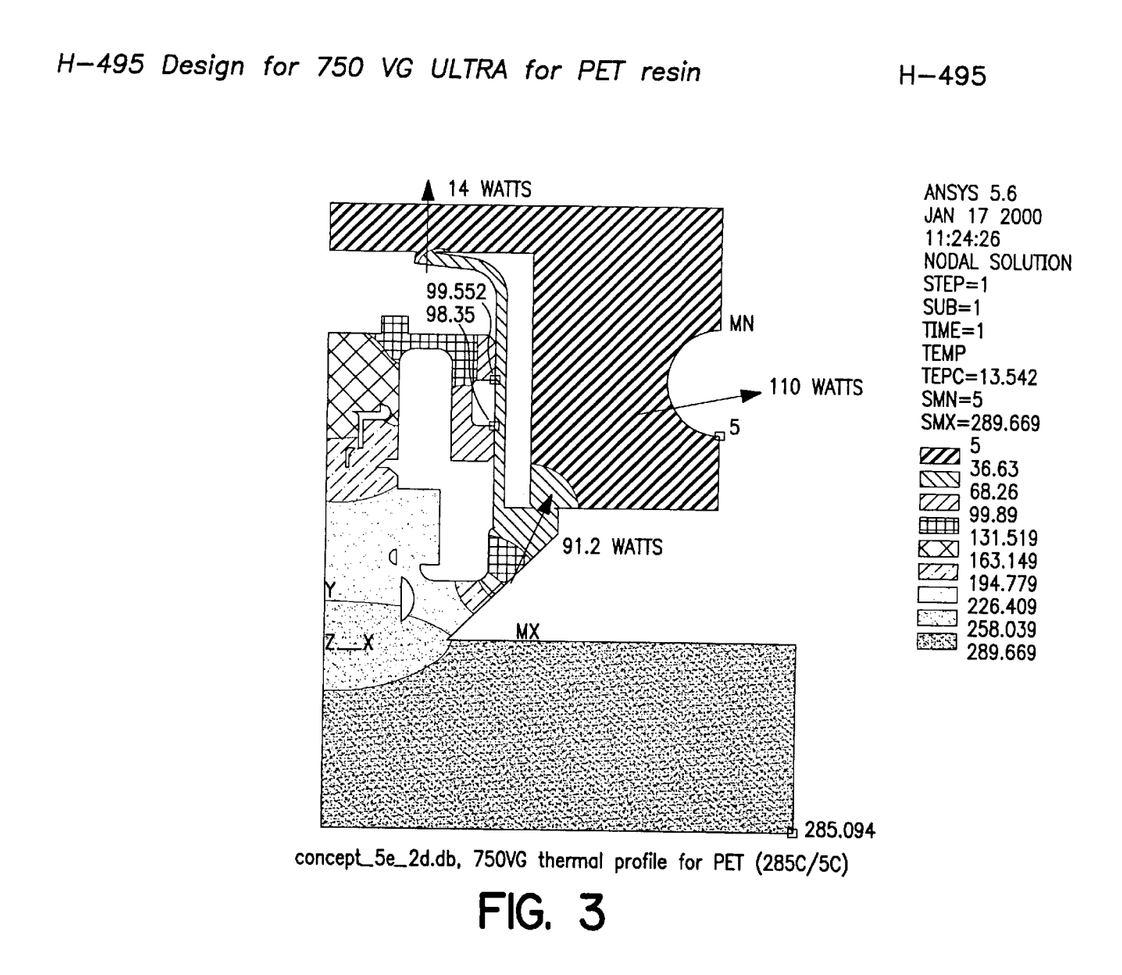
FIG. 3. A thermal image section view of the air piston cylinder installation for the instant invention valve gate design.

The thermal characteristics of these design features are contrasted between FIGS. 2 and 3. FIG. 2 shows the thermal profile for a design similar to that shown in U.S. Pat. No. 5,374,182. The heat is conducted from the manifold (red) via the bushing and cylinder wall to the cooled backplate (blue). Almost all the heat lost from the manifold at this location is lost via this conductive route, 86.5 watts, while smaller amounts, 9.2 watts and 11.9 watts, are lost by radiation. The figure also shows the temperature of the cylinder wall surface where the piston seal must operate, 135.2° C. In contrast, FIG. 3 shows the thermal profile of the inventive design of the present invention. Again, most of the heat is lost via the conductive route through the contact area of the backup pad and the backplate, 91.2 watts. However, the surface temperature of the cylinder wall for the seal is now 98.1° C. This is substantially lower than the earlier design and means that less costly seals can be used while a long service life can still be provided.

By removing the backplate and cylinder 24, piston seal 24 can be easily changed, if necessary, thereby maintaining easy serviceability of the assembly.

A second benefit of the air piston assembly design according to the present invention is that the air supply channels 26 and 28 respectively can be simplified to make the drilling of the backplate less costly. Some prior art designs like the '182 Patent required both air supply channels to be provided at the sealing face of the cylinder wall. This meant that the drilling in the plate became more complicated and often required the plate to be thicker to accommodate both circuits within the thickness of the backplate behind the cylinder-sealing plane.

Figure 5:
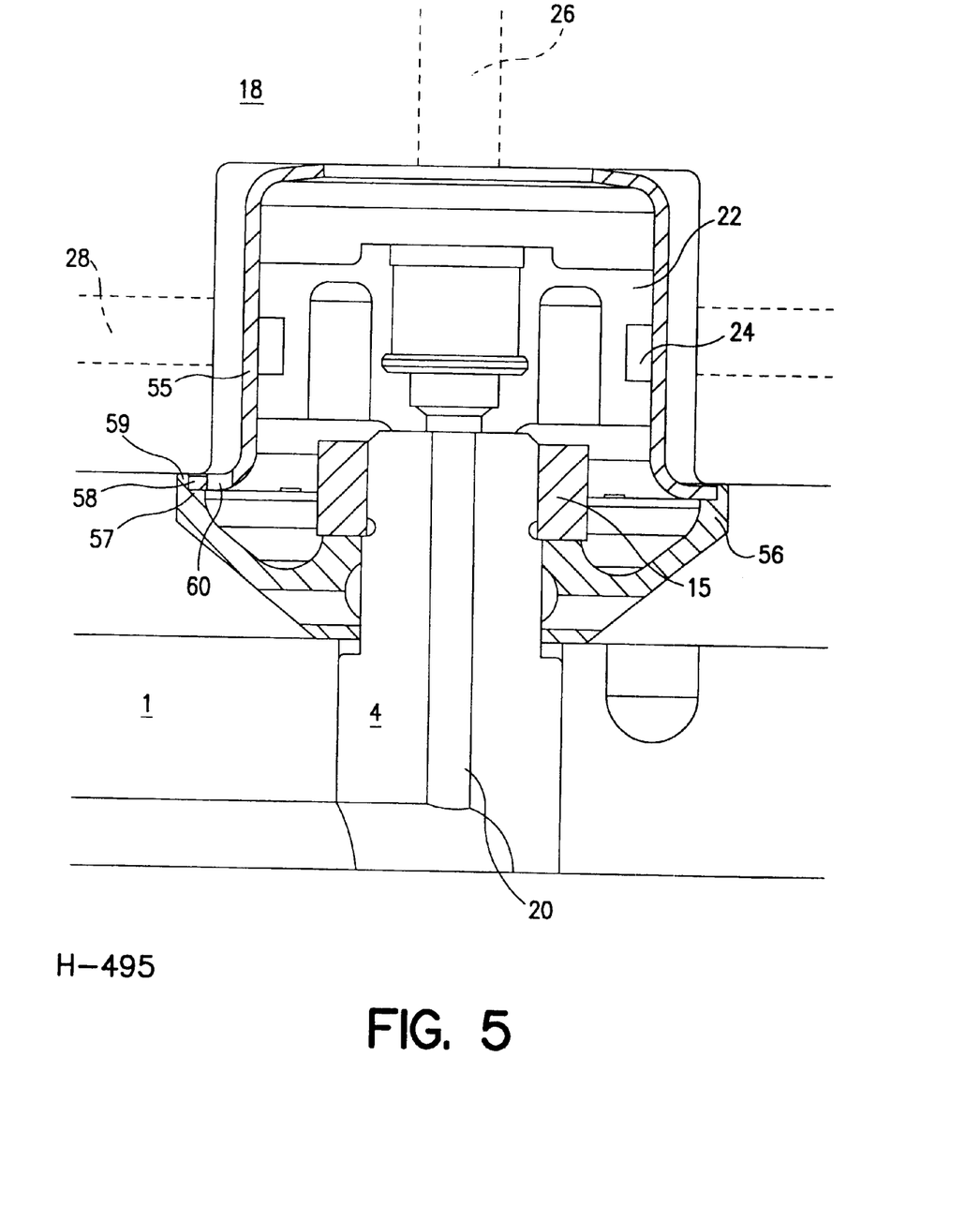
FIG. 5. A section view through the piston/cylinder assembly of an alternate embodiment of the invention.
Figure 6:
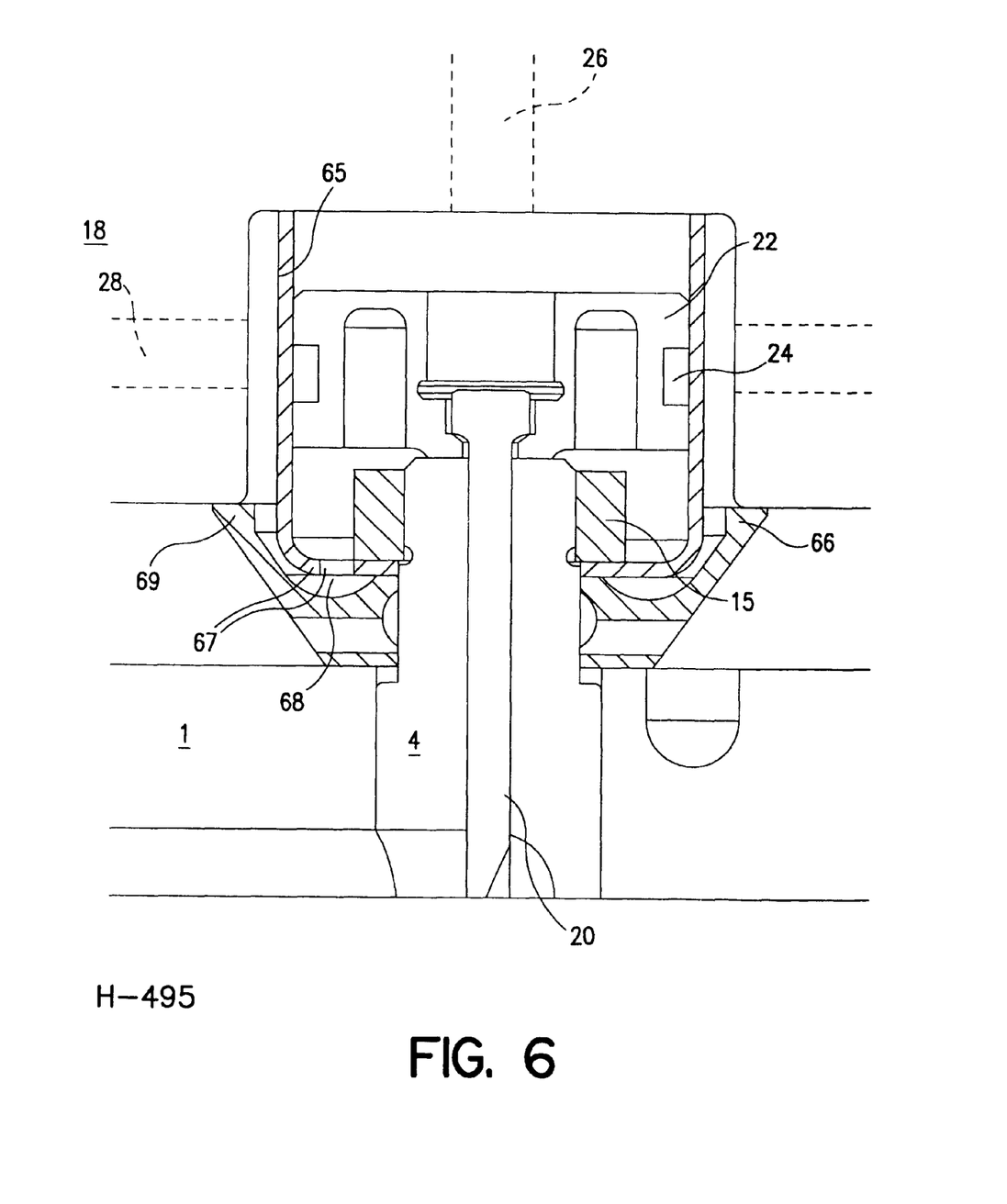
FIG. 6. A section view through the piston/cylinder assembly of a second alternate embodiment of the invention.

FIGS. 5 and 6 show alternate embodiments of the piston/cylinder configuration of the present invention. Common items have the same numbers. FIG. 5 shows that thinwalled cylinder 55 has flanges on both ends that have spring-like characteristics, thereby increasing the range of deflection that can be accommodated in the assembly. The backup pad 56 has been revised to provide an annular recessed surface 57 to locate the lower flange 58. The compressive force transmitted through the backup pad 56 is conveyed to the back plate 18 via raised annular rib 59. Air is supplied to the lower side of piston 22 vial several holes 60 that can be punched through the lower flange 58 of the cylinder at the same time its flanges are formed thereby saving the cost of a separate operation.

FIG. 6 shows a second alternate embodiment in which the thinwalled cylinder 65 has its closed end trapped underneath nut 15 and its open end forming a seal against the bottom of the bore in backplate 18. The closed endwall of the cylinder 67 has springlike characteristics and can flex so that it constantly urges the open end of the cylinder wall to make an air seal against the bottom of the bore in backplate 18. As before, several holes 68 can be punched through the end wall 67, of the cylinder to provide air supply to the lower part of the air piston 22. In this configuration the backup pad 66 has a simplified construction to transmit the compressive force directly to the backplate 18 via annular shoulder 69.

Figure 7:
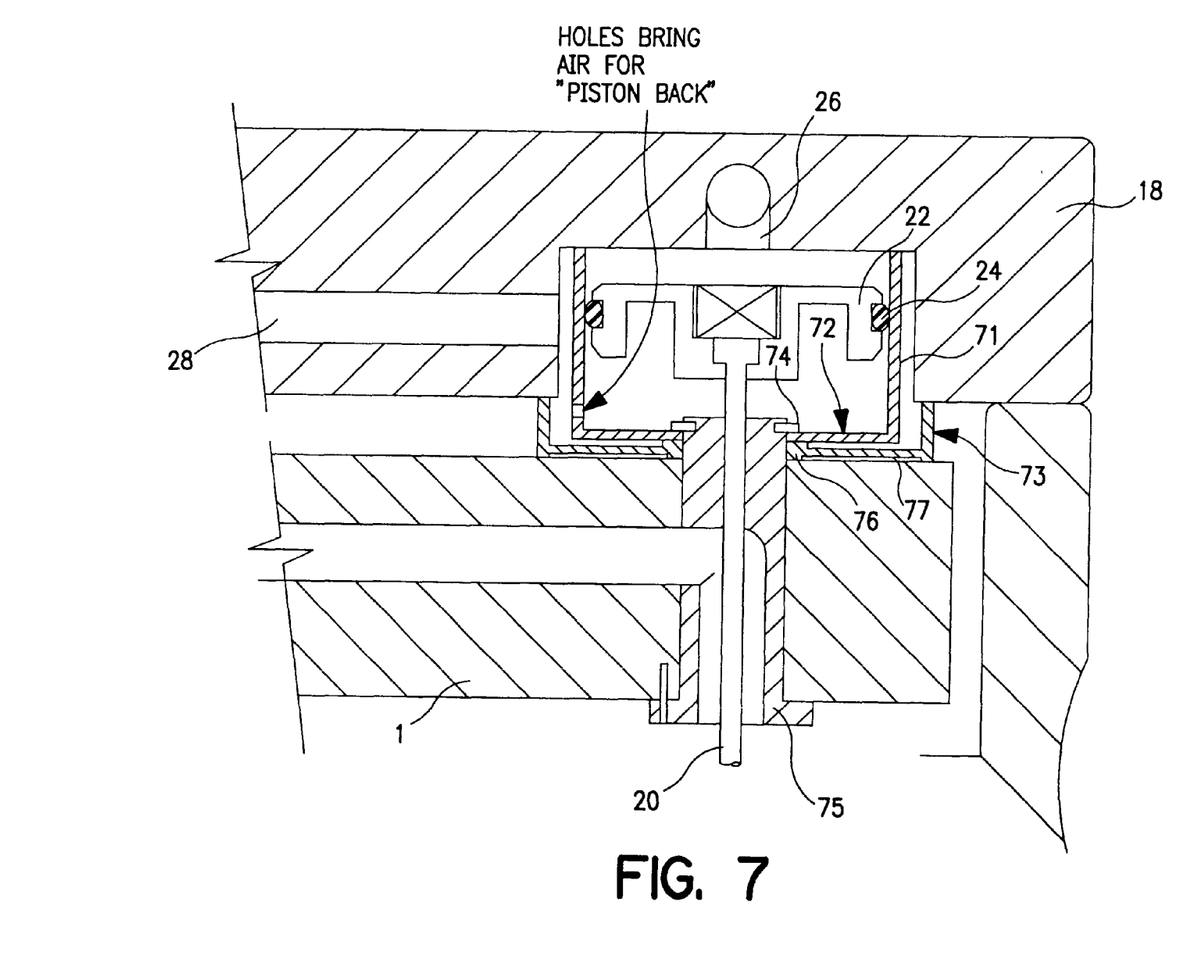
FIG. 7. A section view through the piston/cylinder assembly of a third alternate embodiment of the invention.

FIG. 7 shows a third alternate embodiment in which the thinwalled cylinder 71, similar to that shown in FIG. 6, has its closed endwall 72 having springlike characteristics so that it can flex and constantly urge the open end of the cylinder wall to make an air seal against the bottom of the bore in the backplate 18. The backup pad 73 is a titanium piece having thin sections to minimize the conduction of heat from the manifold 1 to the cooled backplate 18. Both the backup pad and the cylinder 71 are held in place by split ring 74 mounted in bushing 75. Locally, annular thickening 76 of backup pad at the bore fitting over the bushing 75 provides an insulating air gap 77 between the backup pad and the manifold, and clearance between the backup pad and the end wall of cylinder 71 so that there is room for the endwall 72 of the cylinder to flex as it effects the air seal at the open end in the bore of backplate 18.

Figure 8:
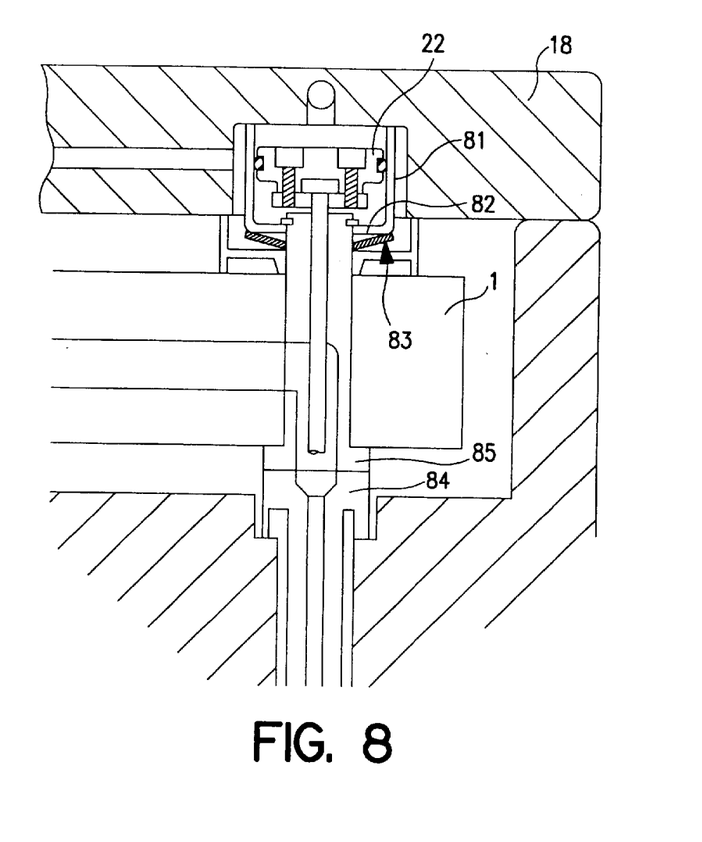
FIG. 8. A section view through the piston/cylinder assembly of a fourth alternate embodiment of the invention.

FIG. 8 shows a fourth alternate embodiment in which the thinwalled cylinder 81 need not have spring-like characteristics in its closed endwall 82, as this feature is provided by a separate spring washer 83. Nozzle housing 84 is conventional and seals against the lower face of bushing 85. However, unlike the prior art examples, shown in the '812 and '230 Patents enclosed herein, the spring washer 83 is also sized to cause a plastic seal to be effected between the housing 84 and bushing 85 from room temperature through the operating temperature of the system and higher to a predetermined maximum designed to prevent plastic leakage even if the system is operated above its normal temperature range. See co-pending application U.S. application Ser. No. 09/575,353 (filed May 19, 2000), incorporated herein by reference for additional teaching on this subject.

Figure 9:
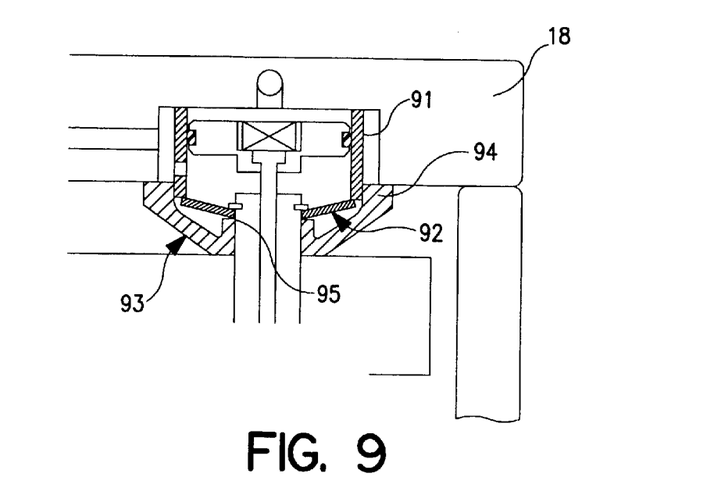
FIG. 9. A section view through the piston/cylinder assembly of a fifth alternate embodiment of the invention.

FIG. 9 shows a fifth alternate embodiment in which the cylinder 91 has no endwall. Instead the endwall is spring washer 92 that urges the cylinder 91 against the bottom of the bore in backplate 18 thereby affecting an air seal. The backup pad 93 centers the cylinder wall and makes an air seal at its lower end 94 and supports the inner face of the spring washer 92 at its bore 95.

Each of the alternate embodiments contains one or more benefit, such as a lower manufacturing cost, improved reliability, ease of assembly or servicing, etc. However, the preferred embodiment, FIG. 1, is considered to contain the best combination of these benefits.

Thus, what has been described in a novel air piston assembly which transmits only a portion of the compressive forces between the manifold and the backplate via the piston cylinder walls. Preferably, the backup pad transmits the other compressive forces, as well as heat, leading to lower cylinder wall temperatures and longer seal life. Moreover, the use of a flex member to hold the cylinder against the backplate also allows the cylinder walls to be made much thinner and thus cooler. This advantageous structure permits looser part tolerances and easier part replacement and servicing.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of sealing an air piston in a hot runner nozzle assembly, comprising the steps of:

sealing the air piston with a piston cylinder disposed between a hot runner manifold and a backplate; and causing compressive forces to be transmitted between the hot runner manifold and the backplate via the piston cylinder and a backup pad.

2. The method of claim 1, further comprising the step of sealing the piston cylinder to the backplate.

3. The method of claim 1, further comprising the step of sealing the piston cylinder to the backup pad.

4. The method of claim 1, further comprising the steps of sealing the piston cylinder to the backplate and to the backup pad.

5. The method of claim 1, further comprising the step of limiting the compressive force on the piston cylinder by flexing a portion of the piston cylinder under the compressive force.

* * * * *